United States Patent [19]
Parry

[11] Patent Number: 5,590,336
[45] Date of Patent: Dec. 31, 1996

[54] METHOD AND APPARATUS FOR PERFORMING OVERLAPPING SERVICE OF MULTIPLE IDE PERIPHERAL DEVICES

[75] Inventor: William G. Parry, Bellevue, Wash.

[73] Assignee: Microsoft Corporation, Redmond, Wash.

[21] Appl. No.: 328,481

[22] Filed: Oct. 25, 1994

[51] Int. Cl.$^6$ .............................. G06F 9/46; G06F 13/22
[52] U.S. Cl. ..................... 395/727; 395/866; 395/878; 395/557; 395/840
[58] Field of Search ........................... 395/727, 866, 395/867, 868, 826, 827, 740, 494, 496, 550, 500, 849, 200.01, 200.08, 289, 878, 840

[56] References Cited

U.S. PATENT DOCUMENTS

| | | | |
|---|---|---|---|
| 3,950,735 | 4/1976 | Patel | 395/550 |
| 4,517,641 | 5/1985 | Pinheiro | 395/840 |
| 5,392,444 | 2/1995 | Inoue | 395/800 |
| 5,483,641 | 1/1996 | Jones et al. | 395/823 |

*Primary Examiner*—Jack B. Harvey
*Assistant Examiner*—Ario Etienne
*Attorney, Agent, or Firm*—Jones & Askew

[57] ABSTRACT

A method and apparatus for performing overlapping service of requests to two peripheral devices, specifically a CD-ROM drive and a hard disk drive connected to a computer. When a read request is issued to the CD-ROM drive, a seek is immediately initiated. A timer, with a period much shorter than the typical seek time of a CD-ROM drive, is started and any requests to the peripheral hard disk drive are initiated. When the timer times out and when the hard disk request is complete, an inquiry is made to determine whether the CD-ROM drive has finished seeking. This inquiry is accomplished by determining the status of a bit set by the CD-ROM drive in a register in the computer when the CD-ROM drive has finished seeking. If the bit is set, indicating the CD-ROM seek is complete, the data transfer request is immediately issued to the CD-ROM drive. If the bit is not set, indicating the CD-ROM seek is not complete, the timer is reset and the service of hard disk drive requests continues.

31 Claims, 3 Drawing Sheets

METHOD AND APPARATUS FOR PERFORMING OVERLAPPING SERVICE OF MULTIPLE IDE PERIPHERAL DEVICES

TECHNICAL FIELD

The present invention relates generally to the control of peripheral devices connected to a computer, and specifically to the overlapping service of requests to a hard disk drive and a CD-ROM drive connected to the computer.

BACKGROUND OF THE INVENTION

Computer systems utilize many different peripheral devices to increase the availability of functions that the computer system can perform. Examples of peripheral devices include terminals, visual display units, printers, scanners, magnetic tape units, and disk drives. Peripheral devices also include auxiliary storage units for storing large amounts of data that cannot be stored in the central processing unit of the computer. These peripheral devices may include hard disk drives and optical disk drives, such as CD-ROM drives.

Peripheral devices are connected to, and controlled by, the computer through a peripheral interface. The peripheral interface recognizes what types of peripheral devices are connected to the computer and facilitates the proper flow of information and commands to and from the peripheral devices. Because the electrical and mechanical requirements differ from one peripheral device to another, software interfaces are used to standardize the format of the data transferred to and from the peripheral devices.

The peripheral interface that is prevalent today is the Integrated Drive Electronics (IDE) interface, also called the AT bus Attachment (ATA) software interface. The IDE interface utilizes IDE controller circuitry located directly in each peripheral device. The IDE controller, which controls communication between the operating system of the computer and the peripheral devices, is operatively connected to the computer via an IDE socket built into the motherboard of the computer. Alternatively, a small IDE adapter card can be used to adapt the computer to accept an IDE interface drive. An IDE software driver comprising instructions for regulating communication between the operating system of the computer and the peripheral devices is included within the computer.

In operation, the IDE controller first must communicate with the computer on the IDE interface to receive instructions relating to the tasks required of the peripheral devices. This communication is accomplished in accordance with the ANSI specification, as is well known by those skilled in the art, which defines the protocol for the interface between the IDE controller and the computer.

New non-disk peripheral storage devices, primarily CD-ROM drives, are now being equipped with IDE controllers. This connection to a CD-ROM drive is managed by the AT Application Programming Interface (ATAPI). ATAPI, as is well known in the art, was first used on 80286-based computers and is a software interface that allows CD-ROM drives to exist on the IDE interface. The ATAPI interface effectively allows the CD-ROM to be viewed by the computer as a disk peripheral. Because ATAPI allows the CD-ROM to be treated as a disk peripheral, the IDE driver software within the computer can control the CD-ROM drive in the same manner as it controls disk peripherals using the IDE software interface.

A CD-ROM drive, as is well known, is an optical digital data storage device. A CD-ROM drive utilizes a shiny disk into which tiny pits are formed. An optical read head directs a beam of light at the surface of the disk from a laser diode through a series of lenses and mirrors. The disk is connected to a motor, which spins the disk. As the disk containing the pits spins past the read head, a portion of the light incident on the disk is reflected back toward the read head. The degree of reflectivity is dependent upon the presence or absence of pits passing through the light beam. The portion of the disk that is unmarked by a pit has a high reflectivity while the portion marked by a pit has a low reflectivity. These reflections are captured by a photodetector positioned adjacent the laser diode, which decodes the differing intensities of the reflections into digital data.

The optical read head is moveable along the entire radius of the disk so that data located at any point on the disk can be accessed. The CD-ROM disk contains a single spiral track beginning near the center of the disk and ending at its outer edge. The track is divided into many sectors. All sectors are identical in length, regardless of their location on the disk. Therefore, each sector includes an identical portion of disk space and an identical amount of memory. The location of each sector is stored in a special file on the disk, thereby making each sector independently accessible.

When a command is issued to a CD-ROM drive to read digital data stored within a sector, the optical read head within the CD-ROM drive must move from its current position to the radial position corresponding to the desired destination sector. The read head is mounted on a sled that is radially movable in each direction between the center and outer edge of the disk such that any location on the disk may be accessed.

A CD-ROM disk spins continuously but not at a constant speed. The CD-ROM disk spins with constant linear velocity such that the portion of the disk immediately adjacent the read head is always moving at the same speed. Therefore, the length of disk track that passes the read head remains constant (for a time increment) independent of the sector position on the disk. Thus, the CD-ROM disk spins at a speed dependent on the location of the sector in which the desired data is located. When the CD-ROM disk is spinning, the outer portion of the disk is moving faster than the inner portion. To achieve constant linear velocity for the track on the disk, the disk spin speed must be varied. This variation is dependent on the location of the sector from which data is to be read. For example, when a sector at the outer edge of the CD-ROM disk is to be read, the spin speed must be slower than the spin speed required when a sector near the center is to be read. The CD-ROM drive automatically adjusts the spin speed according to the location of the sector to be read.

Therefore, when a new sector on the CD-ROM drive is accessed, two events occur. First, the sled holding the read head is moved radially via actuators to the new location. This movement of the sled, being mechanical in nature, is limited by inertial and frictional forces. A certain amount of time is required for the sled to overcome the effects of inertia and friction so as to effect its movement. Further time is required to allow the optical head to settle after its movement. This is a slow process relative to the movements of the read/write head of a magnetic hard disk drive because the optical head of the CD-ROM drive is much more massive than the read/write head of a magnetic hard disk drive. Second, the CD-ROM disk spin speed must be adjusted depending on the location of the sector accessed. This adjustment is mechanical, and the inertia of a rapidly spinning disk must be overcome to increase or decrease the disk spin speed. The mechanical movements of the head movement and the mechanical variation of the disk spin speed place absolute minimums on the time required for a CD-ROM drive to access a sector. Only after the movement of the read head is completed and the spin speed of the disk has been adjusted can the read head begin to retrieve data from the CD-ROM disk.

When a command is issued to the CD-ROM to retrieve data, the command is termed a "read" request. A "read" request requires two operations from the CD-ROM drive. First, the read head is repositioned to the position of the sector from which data is to be retrieved, and the spin speed is adjusted accordingly. This first operation is termed a "seek", because the read head seeks the proper location of the sector containing the data to be read. Second, after the seek operation is completed, the read head emits a beam of light and receives corresponding reflections from the surface of the disk to retrieve the data stored thereon. This second operation is termed the "data transfer" operation, because the data encoded on the disk is retrieved by the CD-ROM photodetector and decoded by the CD-ROM electronics. Therefore, a "read" request consists of two parts: the "seek" and the "data transfer" operations.

Typical seek times for CD-ROM drives are approximately one second or more, but vary depending on the location of the destination sector to be read and the current location of the read head. CD-ROM drives therefore have very slow seek times compared to IDE magnetic hard disk drives.

Magnetic hard disk drives include a stack of several rigid aluminum disks, or platters, coated with magnetic material. Data is encoded on each of the disks by magnetizing areas of the disk surface. The read/write head of the magnetic hard disk drive consists of tiny electromagnets that are attached to pivoting arms and positioned very close to the surface of the disks. The arms pivot to move the heads back and forth over the surface of the disks in a generally radial path. Head actuators pivot the arms and thus controls the movement of the read/write heads. When data is read from a hard disk drive, the head is positioned above the appropriate magnetized area of the disk, and the magnetic field of the disk induces a current in the head. The current induced in the head can then be decoded into digital data. Similarly, when data is written onto a hard disk, a current is supplied to the head, which produces a magnetic field which magnetizes a small area of the disk near the head. This small magnetized area represents a digital bit.

Magnetic hard disks, like CD-ROM disks, are formatted into sectors. Typically, the sectors are arranged in slices, such that the sectors at the outer edge of the disk take up more space than the sectors near the center of the disk. However, the data stored within each sector is spaced such that each sector contains an identical amount of data.

The rigid platters of the hard disk drive are connected to a spindle. The spindle is connected to a motor, which spins the disks in unison. Magnetic hard disks spin together at a constant rate, unlike the CD-ROM disks, which spin at varying speeds. Although the sectors of the magnetic hard disk take up different amounts of space, the data stored within each sector is identical. This allows the hard disks to spin at a constant rate to retrieve equal amounts of data regardless of the location of the sector on the disk. Like the CD-ROM sectors, hard disk sectors can be independently accessed by moving the head generally radially to the desired sector location.

The read/write heads of a hard disk drive are much smaller than the optical read heads of a CD-ROM drive. The CD-ROM heads include mirrors and lenses for focusing and directing the light beam toward the optical disk. By contrast, the hard disk heads are merely tiny electromagnets. These lighter heads of the hard disk drive are capable of moving across the surface of the hard disk much faster than the relatively bulky optical read heads of a CD-ROM drive. Also, because the hard disks spin at a constant speed, the hard disk drive does not adjust its spin speed to effect the reading of information from the disk, as must the CD-ROM drive. Therefore, hard disk drives have much shorter seek times as compared to CD-ROM drives. Typical hard disk drives have seek times of around 15 milliseconds as compared to the lengthy seek times of CD-ROM drives which may be one second or more.

The IDE interface can accept a maximum of two peripheral devices at one time. However, these two devices cannot be serviced simultaneously, but only alternatively. When one of these devices is a CD-ROM drive, with its long seek time, and the other is a magnetic hard disk drive, with its short seek time, a serious problem may arise in terms of continued access to the hard disk drive. When the CD-ROM optical read head is seeking, which can take up to one second, the hard disk drive cannot be accessed and many potential operations of the magnetic hard disk drive are lost. Therefore, it is desirable to provide overlapping service of the CD-ROM drive and the hard disk drive so that any pending requests from the computer to the faster hard disk drive will be executed while the slower CD-ROM drive is seeking.

The IDE, or ATA, software interface used between the operating system of the computer and the peripheral devices provides only a limited overlapping operation. This prior art operation allows issuance of a seek command to a first slower peripheral device which interrupts the computer to acknowledge that the seek of the first peripheral device has begun. Once the seek interrupt has been received by the computer, the computer initiates a request to the second faster peripheral device, which results in minimal overlapping service and some marginal performance improvement.

The interrupt does not, however, indicate whether or not the slower peripheral device has completed its seek operation. Typical implementations try to circumvent this problem by checking to see if there is a request for the faster second peripheral device (hard disk drive) before initiating a seek for the slower first peripheral device (CD-ROM drive). If a request for the second faster peripheral device exists, the seek operation of the first slower device is initiated, and the request for the second faster device is issued while the first slower peripheral device seeks. When the execution of the request to the second, faster device is completed, the second device sends an interrupt to the computer. Upon receipt of the interrupt, the computer continues the execution of the original request for the first slower device regardless of the status of the seek and prepares to commence the data transfer.

Unfortunately, if the computer has only a request outstanding for the first slower device but not for the second faster device, an entire read command (both seek and data transfer operations) must be issued for the first slower device. The computer cannot issue merely a seek for the first device because no seek completion status interrupt will be received, and thus the computer will not know when the seek is completed and the data transfer should begin. This could potentially result in the first slower peripheral device sitting indefinitely idle after it has completed seeking in the absence of a request to the second peripheral device. Therefore, in this case, the entire read request to the first device is issued and must be completed before service of the second peripheral is permitted.

The current operation for overlapping service of peripheral devices described in the preceding section is more fully shown in FIG. 1. FIG. 1 demonstrates the limitations of the existing method of overlapping service of peripheral devices. As shown in FIG. 1, the method begins at step 110, which determines whether there is a read request for a first slower peripheral device, such as a CD-ROM drive. If there is no read request for the CD-ROM drive, the method follows the "no" branch 112 and waits until such a read request for the CD-ROM drive arrives.

When a read request for the CD-ROM drive is present at step 110, the method follows the "yes" branch 114 to step 120. At step 120, the method determines whether or not there is a pending request for a second faster peripheral device such as a magnetic hard disk drive. If a request for the hard disk drive is pending at step 120, the prior art method follows the "yes" branch 122 to step 140 where the method proceeds to initiate a seek operation for the CD-ROM drive. If, however, there is no pending request for the hard disk drive at step 120, the method follows "no" branch 124 to step 130 where the CD-ROM is instructed to execute a complete read request including both a lengthy seek operation and a data transfer operation.

Returning to step 140, the CD-ROM drive initiates a seek operation only because there is a pending request for the hard disk drive (step 120, "yes" branch 122). After the CD-ROM drive has begun its seek operation, the CD-ROM drive sends an interrupt to the computer indicating that the CD-ROM drive has initiated its seek operation. Once the interrupt has been received by the computer at step 150, the computer initiates the execution of the pending request to the hard disk drive at step 160. The software then waits in the "no" branch 174 of step 170 until the hard disk drive has completed its request. After the hard disk drive request is completed as indicated by the "yes" branch 172 at step 170, the data transfer is executed by the CD-ROM drive at step 180.

As previously noted, if a pending request to the hard disk drive is not present at step 120 after a read request has been issued to the CD-ROM drive at step 110, the prior art method immediately initiates the entire read request (seek and data transfer) to the CD-ROM drive at step 130. This demonstrates the inability of the prior art overlapping method to efficiently utilize the time (as much as one second) during which the CD-ROM drive is seeking to execute requests to the hard disk drive. Therefore, when a hard disk drive request is issued shortly after the read request for the CD-ROM drive is issued, the hard disk drive request is not serviced until the CD-ROM read request (seek and data transfer) is completed at step 130.

Even when a hard disk request is pending at step 120, the time, during which the CD-ROM drive is seeking, is used to service only one hard disk request (step 160). This likewise results in inefficient use of the time during which the CD-ROM drive is seeking. The presence of a pending request to the hard disk drive is the sole parameter that allows only minimal overlapping service of a single request to the hard disk drive. When this hard disk drive request is absent, no overlapping service of requests to the hard disk drive can be performed until the read request to the CD-ROM drive is completed. The above described prior art method yields unacceptable results when the first peripheral device has a substantially longer seek time than the second peripheral device, as occurs when the first device is a CD-ROM drive and the second device is a hard disk drive.

SUMMARY OF THE INVENTION

The present invention provides a method and system for performing overlapping service of two peripheral devices, such as a CD-ROM drive with a slower seek time and a hard disk drive with a relatively faster seek time, each being connected to a computer via a respective internal IDE controller. An IDE software driver within the computer contains software for implementation of the invented method. When a read request is issued by the computer to the CD-ROM drive, a seek request is immediately issued to the CD-ROM drive by the IDE software driver within the computer. This seek request is issued immediately regardless of whether a hard disk drive request is pending. A timer, with a period much shorter than the typical seek time of a CD-ROM drive, is started and a request to the hard disk drive, whether pending or newly received, is initiated by the IDE software driver. The period of the timer may be varied depending on the anticipated time required for the seek operation. When the timer times out or when the hard disk drive request is complete, an inquiry is made by the IDE software driver to determine whether the CD-ROM drive has finished seeking. This inquiry is accomplished by checking the status of a bit set by the CD-ROM drive in a register in the computer when the CD-ROM drive has finished seeking. If the bit is set, indicating the CD-ROM drive seek is completed, the data transfer request is immediately issued to the CD-ROM drive. If the bit is not set, indicating the CD-ROM drive seek is not completed, the timer is reset, and service of hard disk drive requests continues until the timer times out or the hard disk drive completes another request.

Thus, it is an object of the present invention to provide a method and system for performing overlapping service of two peripheral devices.

It is a further object of the present invention to provide a method and system for performing overlapping service of requests to two peripheral devices having substantially differing seek times.

It is a further object of the present invention to provide an efficient method of servicing requests for peripheral devices by reducing the time in which each peripheral device sits idle waiting for the servicing of the other peripheral device to be completed.

It is yet another object of the present invention to provide overlapping service of requests to a hard disk drive and a CD-ROM drive, each connected to a computer via an IDE controller.

It is a still further object of the present invention to provide service of requests to a hard disk drive while performing a seek on the CD-ROM drive.

Other objects, features, and advantages of the present invention will become apparent upon reading the following specification, when taken in conjunction with the drawings and the appended claims.

DETAILED DESCRIPTION OF THE PREFERRED EMBODIMENT

Turning next to the figures, the preferred embodiment will now be described in detail. The method of the present invention is useful in connection with a computer system in which two peripheral devices with differing seek times, such as a CD-ROM drive and a hard disk drive, are each connected to the computer via a respective IDE controller located within each peripheral device.

In general, the method of the invention provides overlapping service of requests to a peripheral CD-ROM drive and a peripheral hard disk drive by separately executing the seek and the data transfer operations that comprise the read request for the CD-ROM drive. While the CD-ROM drive is seeking, a timer having a period much shorter than the typical CD-ROM drive seek time is started, and a request to the hard disk drive is executed. A determination is made as to whether the CD-ROM drive has finished seeking both when the timer times out and also when each hard disk drive request is completed. If the CD-ROM drive seek is completed at the end of the timer time out or at the end of the hard disk drive request operation, the CD-ROM read request is completed by executing the data transfer operation. If the CD-ROM drive seek is not completed, the timer is reset and another request to the hard disk is executed. In this manner, the relatively lengthy seek time of the CD-ROM drive is effectively utilized to service multiple hard disk drive requests.

The present method effects the overlapping service of requests to two peripheral devices that have different access times. The requests include either a "read" or a "write" request. CD-ROM drives, limited by the physical manner in which data is stored on the media, are only able to execute read requests, while hard disk drives have the capability to execute both read and write requests. However, read and write requests require nearly identical operations, with the execution of each request requiting a seek and a data transfer operation.

Figure 2:
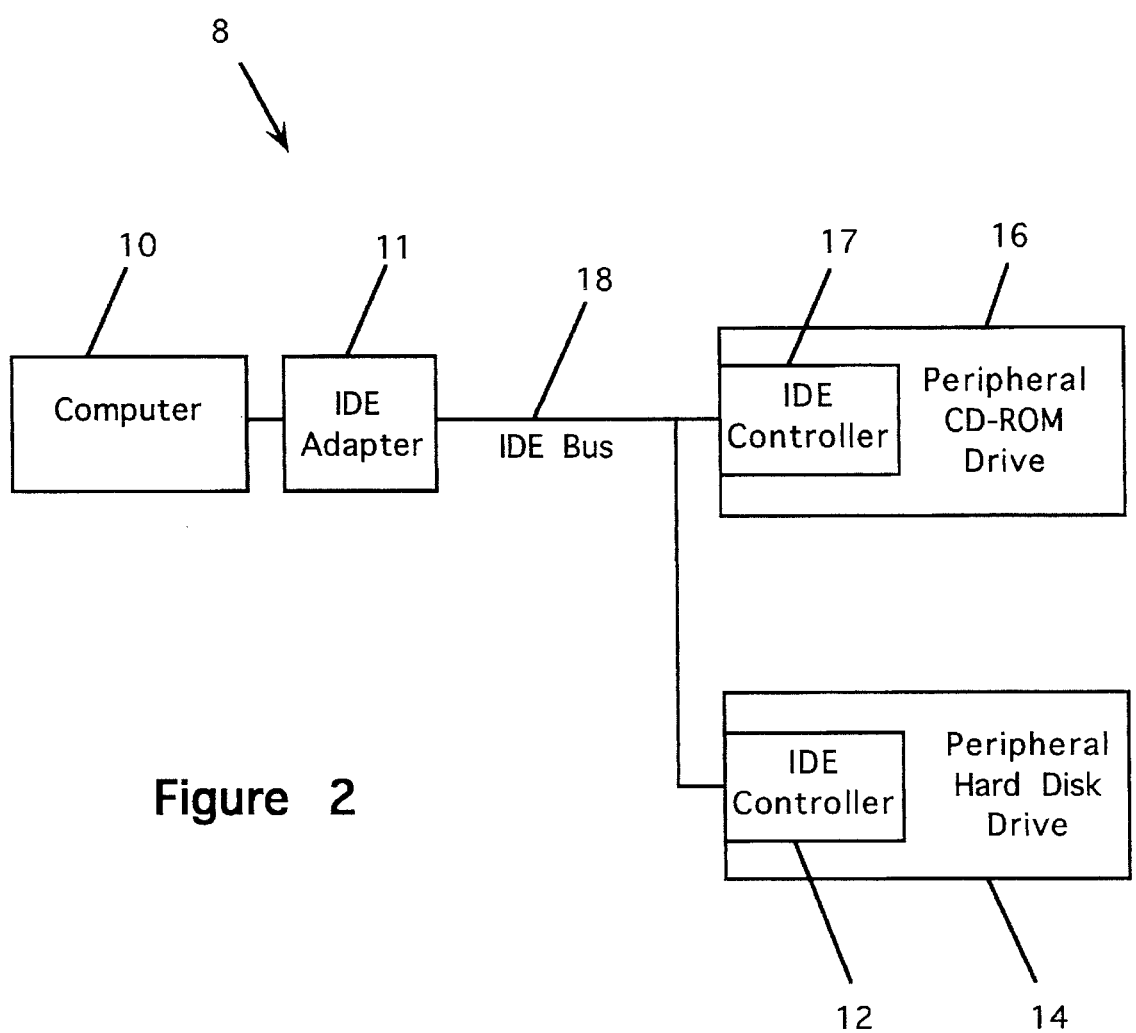
FIG. 2 is a block diagram of a computer system utilizing the present invention.

Turning to FIG. 2, the method of the present invention is implemented on a computer system, generally shown at 8, comprising a computer 10, a first peripheral drive, such as a CD-ROM drive 16, and a second peripheral drive, such as a hard disk drive 14. The CD-ROM drive 16 is connected to the computer 10 via its internal IDE controller 17, and the hard disk drive 14 is connected to the computer via its internal IDE controller 12. The IDE controllers 12 and 17 are connected to the computer 10 via an IDE adapter 11. It should be noted that if the computer 10 has an IDE socket built into its motherboard, the IDE controllers 12 and 17 will connect directly to this socket, making connection to the IDE adapter 11 unnecessary.

The peripheral devices 14 and 16 communicate with the computer 10, through their respective IDE controllers 12 and 17, via the IDE bus 18, the construction and operation of which is known to those skilled in the art. The computer 10, using the IDE interface, can only communicate with one peripheral device at a time. Therefore, the computer 10 controls the peripheral devices alternatively, not simultaneously. An IDE software driver containing software for implementation of the present invention is included within the computer 10 and includes, among other features, a software timer the purpose of which will be more fully explained below. The protocol for the interface between the computer 10 and the IDE controllers 12 and 17 is defined by the ANSI specification and is well known in the art. Similarly, the AT bus Attachment (ATA) software interface, for use between the operating system of the computer 10 and the peripheral drives 14 and 16, is well known to those skilled in the art.

The peripheral CD-ROM drive 16 uses the ATAPI software interface to allow it to communicate with the computer 10. The IDE software driver recognizes that the peripheral device 16 is a CD-ROM drive by recognizing that ATAPI is being used by the CD-ROM drive 16.

When the computer 10 requires data stored on either of the peripheral devices 14 or 16, the computer 10 issues a request to the appropriate peripheral device. In response to a read request from the computer 10 to the CD-ROM drive 16, the IDE software driver within the computer 10 initiates a seek on the CD-ROM drive 16. To execute the seek, the IDE software driver calls a subroutine to determine the location of the current sector and to determine the location of the destination sector from the CD-ROM drive's file system. Once the location of the destination sector is determined, the optical read head is moved to the appropriate location to access the desired sector. The time required for the read head to relocate to the desired sector location is the seek time for the CD-ROM drive and, thus, will be longer when the destination sector is far from the current sector but will be shorter when the destination sector is near the current sector.

The IDE software driver within the computer 10 will implement the method of the present invention when the destination sector and the current sector of the CD-ROM disk are located at least a predetermined minimum distance apart. This minimum distance is preferably about ten sectors, but can vary depending on the period of the timer. When the location of the destination and current sectors is less than the predetermined number of sectors, the IDE software driver assumes that the seek time of the CD-ROM drive will be sufficiently short to render the method of the present invention unnecessary.

Figure 3:
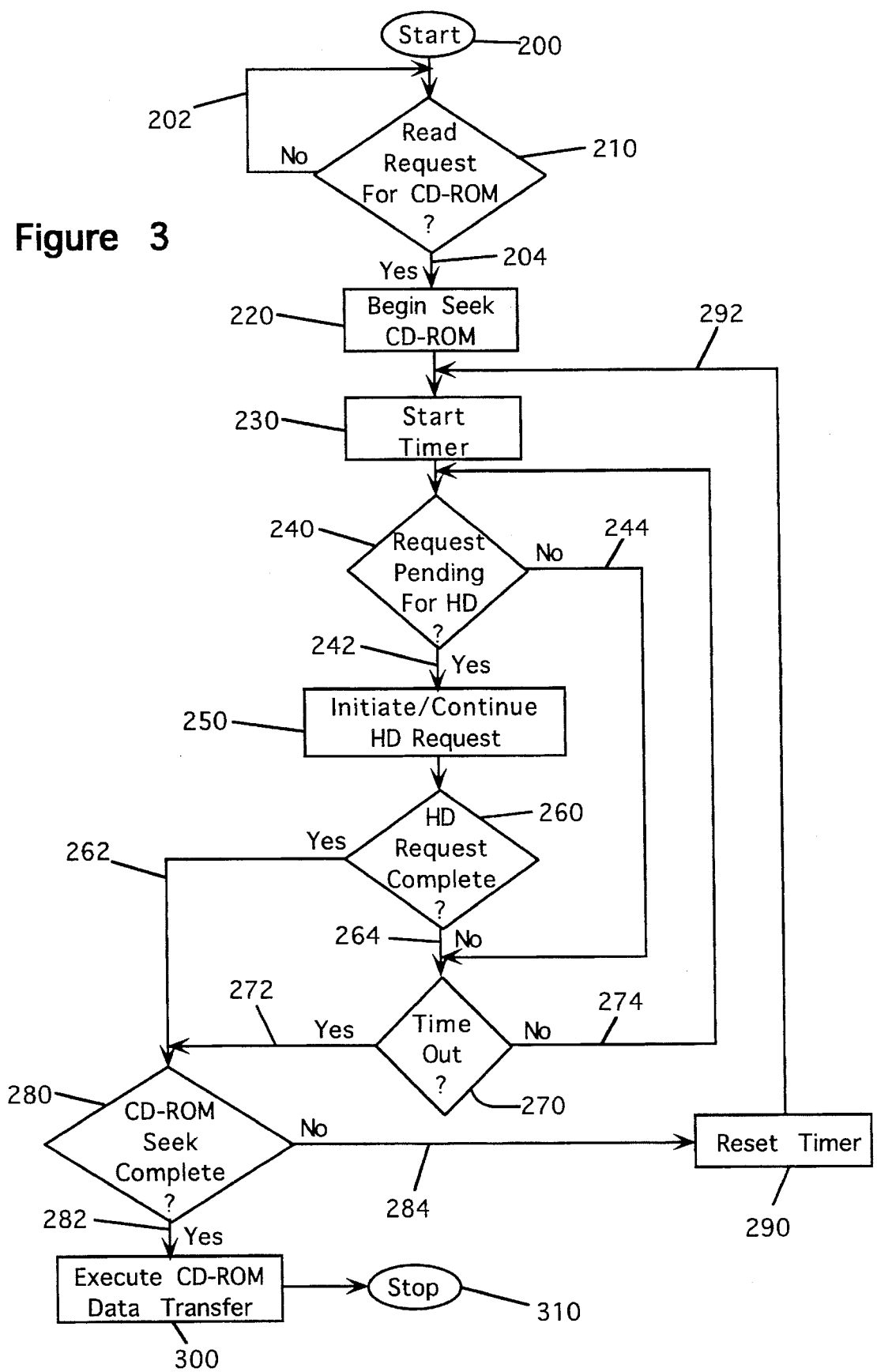
FIG. 3 is a flow chart describing the method of performing overlapping service of two peripheral devices in accordance with the present invention.

FIG. 3 is a flow chart of the method of the present invention. As previously stated, the method can be implemented by software in the IDE software driver in the computer 10 of the computer system 8 (FIG. 2). As shown in FIG. 3, the method begins at 200. At the first step 210, the IDE software driver determines whether a read request has been issued by computer 10 to the peripheral CD-ROM drive 16. The method of the present invention does not proceed to the next step until such a CD-ROM read request has been issued. The IDE software driver continues its query (the "no" loop 202) until the IDE software driver recognizes that a read request to the CD-ROM drive 16 has been made by the computer 10. During the time that there are no read requests pending for the CD-ROM drive 16, requests for the hard disk drive 14 are serviced in standard fashion. When a read request is issued by the computer 10 to the CD-ROM drive 16, the method proceeds along the "yes" branch 204 to step 220.

At step 220, a seek request is issued by the IDE software driver to the CD-ROM drive 16, and the seek operation of the CD-ROM drive commences. After the seek begins, a software timer in the IDE software driver is started at step 230. In the preferred embodiment, the timer is provided by the operating system of the computer 10. For example, in the operating system of the computer 10, a software timer is accessed by issuing a call for service of "Set_Asynch_Timeout", as is familiar to those skilled in the art. The period for which the timer is set is much shorter than the typical seek time of a CD-ROM drive, and is preferably set to approximately 20 milliseconds. By comparison, the typical seek time of the CD-ROM drive 16 is approximately one second.

After the timer begins timing, step 240 determines whether a request for the hard disk drive 14 is pending. This hard disk drive request can include a request that was issued by the computer 10 either before or after the CD-ROM drive request was issued by the computer 10. In either case, step 240 determines the presence or absence of a request issued to the hard disk drive 14. If such a hard disk drive request is pending, the method proceeds along "yes" branch 242, and the request for the hard disk drive 14 is initiated at step 250. Step 250 operates to either continue execution of the hard disk drive request issued before the CD-ROM drive request, or to initiate execution of the hard disk drive request issued after the CD-ROM drive request.

After initiation (or continuation) of the request to the hard disk drive 14 at step 250, the method next determines whether the request to the hard disk drive 14 is complete at step 260. When a request to the hard disk drive 14 is complete, the IDE controller 12 on the hard disk drive 14 issues a hard disk drive software interrupt. At step 260, the IDE software driver determines whether the hard disk drive request is complete by determining whether this hard disk drive interrupt has been received. If the hard disk drive interrupt is received, then the IDE software driver determines that the request issued to the hard disk drive 14 is complete, and the method proceeds along the "yes" branch 262 to step 280. At step 280, the IDE software driver checks to determine if the CD-ROM drive 16 has completed seeking. If at step 280 the CD-ROM drive 16 has finished seeking, the method follows the "yes" branch 282 to step 300, where the data transfer operation for the CD-ROM drive is executed, thereby completing the original read request issued to the CD-ROM drive at step 210. After the data transfer is complete, the process terminates at 310.

Returning to step 240, if there is no pending request for the hard disk drive 14 after the timer has been started at previous step 230, the method follows the "no" branch 244 to step 270, bypassing steps 250 (initiate hard disk request) and 260 (hard disk request complete). Likewise, if the request to the hard disk drive is not completed, as determined at step 260 by the absence of the hard disk drive interrupt, the method follows the "no" branch 264 to step 270 to determine whether the timer has timed out. When the timer times out, a timer complete software interrupt is issued. The IDE software driver determines whether the timer has timed out by detecting this timer interrupt. If the timer has timed out, the timer interrupt is received by the IDE software driver, and the method follows the "yes" branch 272 to step 280 where the IDE software driver determines whether the CD-ROM drive 16 has finished its seek operation. If, however, the timer has not timed out, as determined at step 270 by the absence of the timer interrupt, the method follows the "no" branch 274 and returns to step 240 for continued processing and monitoring of requests to the hard disk drive 14.

If, however, at step 280, the IDE software driver determines that the CD-ROM drive has not finished its seek operation, the method follows the "no" branch 284 to step 290 where the timer is reset. Once the timer is reset, the method returns along branch 292 to step 230 where the timer is started and further processing and monitoring of requests to the hard disk drive 14 are performed.

Figure 1:
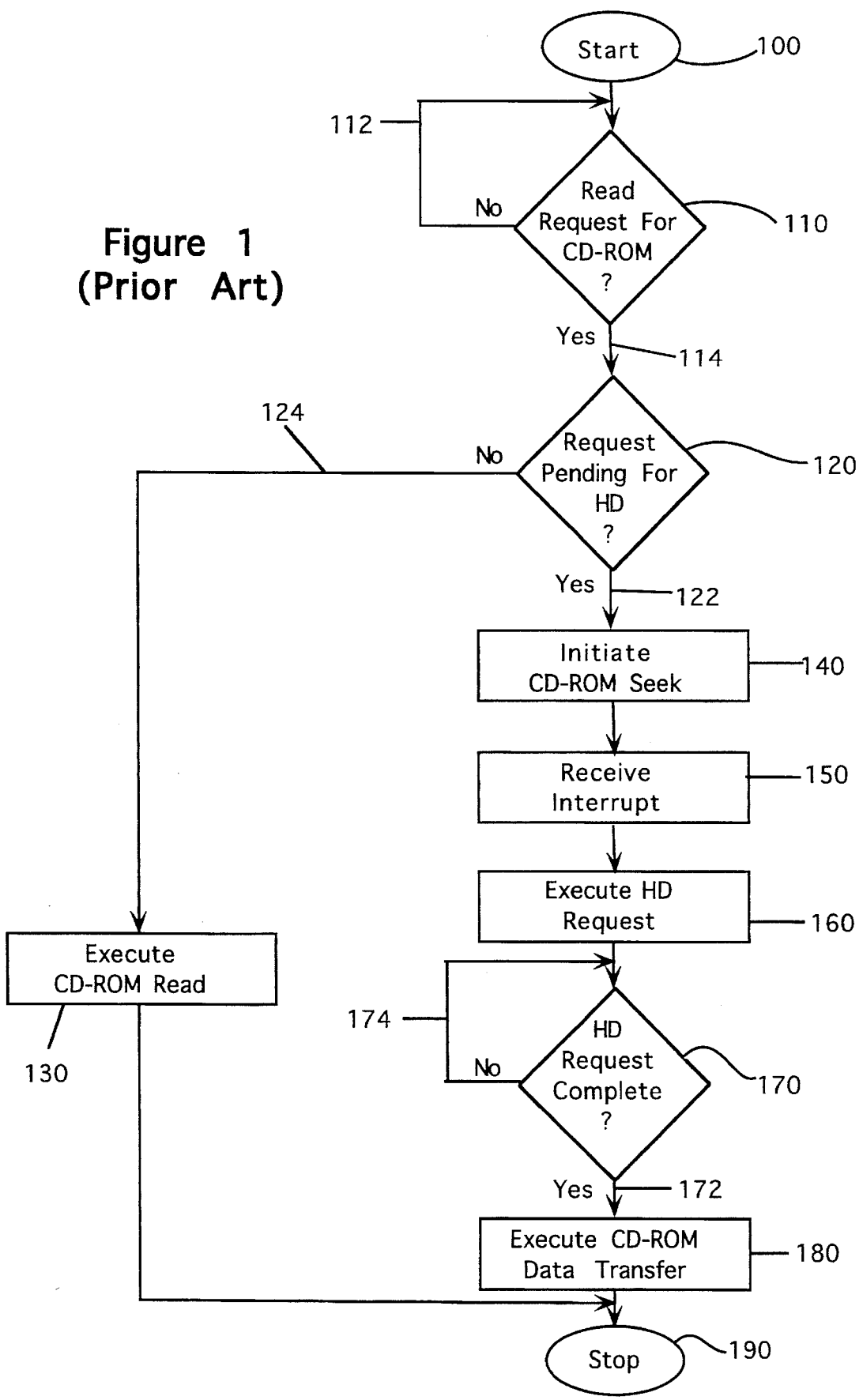
FIG. 1 is a flow chart describing the prior art method of overlapping service of two peripheral devices.

As can be ascertained from FIG. 3 and the above description of the method of the present invention, the invented method assures that execution of requests issued to the hard disk drive 14 will not be delayed while the slower CD-ROM drive 16 completes a seek operation. If no hard disk drive request is issued or pending (step 240), and if the timer interrupt has not been received, signifying that the timer has not timed out (step 270), the invented method follow the "no" branch 274 to return to step 240 to continuously determine whether a hard disk drive request has issued. Even when step 280 is executed to determine whether the CD-ROM drive has completed its seek operation, the time required for the execution of this step is only a few microseconds. If the CD-ROM drive has not completed its seek operation, the steps of resetting and starting the timer, at steps 290 and 230, respectively, to return to further monitoring of hard disk drive requests, take very little time. This approach to overlapping service of the peripheral devices is contrary to the method currently employed, as shown in FIG. 1. FIG. 1 shows that if a hard disk drive request is not present (step 120) when the CD-ROM read request is present (step 110), any subsequently issued requests to the hard disk drive are not serviced until the CD-ROM drive completes its entire read request (step 130), which takes approximately one second. The present invention acts to virtually eliminate this waiting period. This reduction in the waiting period in accordance with the present invention allows many hard disk drive requests to be serviced while the CD-ROM drive is seeking.

Similarly, in accordance with the present invention, the longest amount of time that the CD-ROM drive must wait, after its seek is complete, before initiating the data transfer request, is approximately the period of the timer, preferably set to 20 milliseconds. This 20 millisecond delay occurs when the timer resets (FIG. 3, step 290) just before the CD-ROM drive's seek is completed. Of course, the shortest time that the CD-ROM drive would have to wait is theoretically zero, because the timer may time out and a seek complete determination is made (step 280) at the instant the CD-ROM seek is actually completed. Therefore, the use of the timer requires that the CD-ROM drive wait no longer than the period of the timer to begin the data transfer operation after the seek has been completed.

FIG. 3 demonstrates that the method of the present invention uses two different and independent variables to control the frequency of overlapping service of requests to peripheral devices. These variables are the timing out of the timer, as determined at step 270, and the completion of the hard disk request, as determined at step 260. Upon the occurrence of either of these events, a query is made to determine whether the CD-ROM seek is complete. If the seek is incomplete, service of hard disk requests continues regardless of whether the service includes continuing execution of existing hard disk requests, or initiating service of newly received hard disk requests. By the present method, multiple hard disk requests can be serviced during the time the CD-ROM drive is seeking. This provides much improved efficiency compared to the prior method of overlapping service of requests, which provides the service of only a single pending hard disk request, and does not allow any overlapping service of requests issued shortly after the CD-ROM request is made.

Two timing sequences are possible with regard to the requests issued to the peripheral devices. The request to the CD-ROM drive may exist prior to the request to the hard disk drive, or the hard disk request may exist prior to issuance of the CD-ROM request. However, the method of the present invention is blind to these alternate timing sequences. It should be noted that step 240, which determines whether a hard disk request is pending, covers both the situation where the hard disk request is newly issued and has not yet been executed, as well as the situation where the hard disk request has been received and the execution of the request is in progress, but not yet completed. It is seen that when neither the hard disk request has been completed nor the timer timed out, the process returns to step 240, and the processing of hard disk requests, whether newly issued or already existing, continues.

By allowing the system to monitor and execute pending hard disk requests during the time that the CD-ROM drive is seeking, the CD-ROM drive's seek time is efficiently utilized. If the timer were not used, it would be possible that the CD-ROM drive would not be able to complete its read request after initiating a seek. This would occur if no hard disk request is issued after the CD-ROM seek is issued. Because the CD-ROM drive 16 does not alert the computer 10 when the CD-ROM drive has completed seeking, the computer 10 will not know that the CD-ROM drive is finished seeking. The inclusion of a timer in the invented method allows the IDE software driver to periodically check, each time the timer times out, to determine whether the CD-ROM drive has finished seeking. If this timer was not used, and no hard disk request was initiated, then the CD-ROM drive would not be able to complete its data transfer after the seek has completed.

The timer, started at step 230, has a period set to a value much less than the maximum seek time of a peripheral CD-ROM drive. A sufficiently short time period is necessary for efficient monitoring of the status of the CD-ROM drive's seek operation. It is preferred that the timer period be sufficiently short such that the invented method shown in FIG. 3 can make many cycles within a single seek of the CD-ROM drive 16. A cycle involves the execution of a hard disk request and includes the steps 230 through 290. Additionally, the checking of the CD-ROM seek status when a hard disk request is completed allows the invented method to make many additional cycles because the hard disk request may be complete very shortly after the timer begins. This allows many more hard disk requests to be executed during one CD-ROM drive seek operation than would otherwise be serviced using the timer alone.

Furthermore, in an alternative embodiment of the present invented method, the IDE software driver, by determining the locations of the destination sector relative to the current sector, can vary the period of the timer depending on the distance to each destination sector. For example, when the destination sector is far from the current sector, the tuner can be set to have a longer period, whereas when the destination sector is near the current sector, the timer can be set to have a shorter period.

The timer is started after the CD-ROM drive's seek operation begins. During the period of the timer, the IDE bus 18 is free so the computer 10 may issue requests to the peripheral hard disk drive 14. When the timer times out, the timer complete software interrupt calls a routine in the IDE software driver to determine whether the CD-ROM drive has finished seeking. Additionally, when a hard disk request has been completed, as determined by the hard disk drive software interrupt, the CD-ROM seek complete routine is called.

When the CD-ROM seek is complete, the IDE controller 17 in the CD-ROM drive 16 sets a bit in the computer 10, which has a single set of registers for use by both peripheral devices. This bit, the "Drive Seek Complete" (DSC) bit, is monitored by a subroutine in the IDE software driver. The determination of whether the CD-ROM drive is finished seeking (step 280) is carried out by the subroutine monitoring of the DSC bit. If the bit is set, then the CD-ROM seek is complete ("yes" branch 282) and the CD-ROM data transfer operation is initiated (step 300). If the bit is not set, the CD-ROM drive's seek operation is incomplete ("no" branch 284), the timer is reset (step 290), and the service of hard disk requests continues (steps 230 though 260). The DSC monitoring subroutine is subsequently triggered every time the timer times out ("yes" branch 272), and is also triggered every time the hard disk drive completes execution of a request ("yes" branch 262). The subroutine to check the status of the DSC bit takes only a few microseconds to complete, therefore, this routine can be called very frequently and yet not adversely effect the efficiency of the overlapping service of requests.

The present invention is applicable only to a computer system in which two peripheral devices are connected to a computer. If only one peripheral device is used, the overlapping mechanism is unnecessary. Because the IDE interface, to which the peripheral devices are connected, is only able to alternately, and not simultaneously, control two peripheral devices, the present invention is limited to a computer system utilizing two peripheral devices with differing seek times. When the peripheral devices have nearly equal seek times, such as when both peripheral devices are hard disk drives, the effectiveness of the present invention is diminished because the servicing of requests to each peripheral device takes approximately the same amount of time. The present invention makes use of the long seek time of the CD-ROM drive 16 to execute multiple requests to the faster access hard disk drive 14. Therefore, the present invention is preferably utilized with a system having a first peripheral device comprising a CD-ROM drive and a second peripheral device comprising a hard disk drive.

Because the time required for the data transfer of the read request to the CD-ROM drive is nearly equal to the data transfer time for the hard disk drive, no overlapping of service during the data transfer operation of the CD-ROM drive is feasible. Therefore, the only overlapping of service is performed during the relatively long seek operation of the CD-ROM drive.

In summary, the invention includes a method for providing overlapping service of requests to a peripheral CD-ROM drive and a peripheral hard disk drive, by separately executing the seek and the data transfer operations that comprise the CD-ROM read request. While the CD-ROM drive is seeking, a timer with a short period is started and a request to the hard disk drive is executed. When either the timer times out or when the hard disk request is completed, a query is made to determine whether the CD-ROM drive has finished seeking. If the CD-ROM seek is complete, the CD-ROM read request is completed by executing the data transfer operation, but, if the CD-ROM seek is not complete, the timer is reset and another request to the hard disk drive is executed. By utilizing this method, the lengthy seek time of the CD-ROM drive is used effectively to service hard disk requests.

From the foregoing it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A method for performing overlapping service of requests from a computer to multiple peripheral devices connected to the computer, wherein each request includes a seek and a data transfer operation and wherein the time required for a first peripheral device to complete a seek operation is longer than the time required for a second peripheral device to complete a seek operation, said method comprising the steps of:

initiating a seek operation for the first peripheral device in response to a request from the computer to the first peripheral device;

starting a timer;

initiating execution of a request from the computer to the second peripheral device;

determining whether the first peripheral device has completed its seek operation when the timer times out;

executing a data transfer operation for the first peripheral device if the first peripheral device has completed its seek operation;

resetting the timer and returning to said step of starting the timer if the first peripheral device has not completed its seek operation.

2. The method of claim 1 further comprising the steps of determining whether the execution of the request to the second peripheral device is complete and determining whether the first peripheral device has completed its seek operation when execution of the request to the second peripheral device is complete.

3. The method of claim 1 wherein the first peripheral device is a CD-ROM drive.

4. The method of claim 1 wherein the second peripheral device is a hard disk drive.

5. The method of claim 1 wherein the first peripheral device is a CD-ROM drive and the second peripheral device is a hard disk drive.

6. The method of claim 1 wherein the timer has a period at least an order of magnitude less than the maximum time required for the first peripheral device to complete a seek operation.

7. The method of claim 1 wherein the first peripheral device is a CD-ROM drive and the timer has a period of approximately 20 milliseconds.

8. The method of claim 1 wherein the timer is based on the system clock timer of the operating system of the computer.

9. The method of claim 1 wherein the first peripheral device includes a read head and a disk having data stored thereon in a plurality of sectors, wherein said method is performed only when the request to the first peripheral device specifies a destination sector which is located at least a predetermined distance from the location of the current sector where the read head is located at the time the request is initiated.

10. The method of claim 9 wherein the first peripheral device is a CD-ROM drive and the predetermined distance is at least ten sectors.

11. The method of claim 9 wherein the period of the timer is variable depending on the location of the destination sector relative to the current sector.

12. The method of claim 1 wherein the peripheral devices are connected to the computer via a controller and the first peripheral device sets a bit in a register in the controller when the first peripheral device has completed its seek operation, and wherein said step of determining whether the first peripheral device has completed its seek operation is determined by monitoring the status of the bit.

13. A method for performing overlapping service of requests from a computer to a CD-ROM drive and a hard disk drive connected to the computer, where each request includes a seek and a data transfer operation, said method comprising the steps of:

initiating a seek operation for the CD-ROM drive in response to a request to the CD-ROM drive;

starting a timer having a period at least an order of magnitude less than the maximum time required for said first peripheral device to complete a seek operation;

initiating a request to the hard disk drive;

determining whether the CD-ROM drive has completed its seek operation when the timer times out;

determining whether the execution of the request to the hard disk drive is complete;

determining whether the CD-ROM drive has completed its seek operation when execution of the request to the hard disk drive is complete;

completing the request for the CD-ROM drive by executing a data transfer operation if the CD-ROM drive has completed its seek operation;

resetting the timer and returning to said step of starting the timer if the CD-ROM drive has not completed its seek operation.

14. A computer system for performing overlapping service of requests from a computer to multiple peripheral devices connected to the computer, wherein each request includes a seek and a data transfer operation, said computer system comprising:

a first and second peripheral device connected to said computer;

first driver means in said computer for initiating a seek operation for said first peripheral device in response to a request from said computer to said first peripheral device;

timer means for timing a predetermined period of time in response to the initiation of said seek operation for said first peripheral device;

second driver means in said computer for initiating execution of a request from said computer to said second peripheral device;

first determining means in said computer for determining whether the execution of the request to said second peripheral device is complete;

second determining means in said computer, responsive to said timer means and said first determining means, for determining whether said first peripheral device has completed its seek operation;

third driver means in said computer, responsive to said second determining means, for executing a data transfer operation for said first peripheral device if said first peripheral device has completed its seek operation; and timer reset means, responsive to said second determining means, for resetting the timer means if said first peripheral device has not completed its seek operation.

15. The system of claim 14 wherein said timer means is based on the system clock timer of the operating system of said computer.

16. The system of claim 14 wherein the predetermined period of the timer means is at least an order of magnitude less than the maximum time required for said first peripheral device to complete a seek operation.

17. The system of claim 14 wherein said first peripheral device is a CD-ROM drive and said timer means has a period of approximately 20 milliseconds.

18. The system of claim 14 wherein said second determining means determines whether said first peripheral device has completed its seek operation when said timer means has timed out.

19. The system of claim 14 wherein said second determining means determines whether said first peripheral device has completed its seek operation when the execution of the request to said second peripheral device is complete.

20. The system of claim 14 wherein the time required for said first peripheral device to complete a seek operation is longer than the time required for said second peripheral device to complete a seek operation.

21. The system of claim 14 wherein said first peripheral device is a CD-ROM drive.

22. The system of claim 14 wherein said second peripheral device is a hard disk drive.

23. The system of claim 14 wherein said first peripheral device is a CD-ROM and said second peripheral device is a hard disk drive.

24. The system of claim 14 wherein said first peripheral device includes a read head and a disk having data stored thereon in a plurality of sectors, wherein said timer means is started only when said first driver means initiates a request for data located in a destination sector located at least a predetermined distance from the location of the current sector where said read head is located at the time the request is initiated by said first driver means.

25. The system of claim 24 wherein said first peripheral device is a CD-ROM drive and the predetermined distance is at least ten sectors.

26. The system of claim 24 wherein the period of said timer means is variable depending on the location of the destination sector relative to the current sector.

27. The system of claim 14 wherein said first peripheral device sets a bit in a register in said computer when said first peripheral device has completed its seek operation, and wherein said second determining means monitors said bit to determine whether said first peripheral device has completed its seek operation.

28. The system of claim 14 wherein said first and second peripheral devices interface with said computer through a first and second IDE controller, respectively.

29. The system of claim 28 wherein said first and second peripheral devices communicate with said computer via a bus.

30. The system of claim 29 wherein said computer communicates with only one of said peripheral devices at a time.

31. A computer system for performing overlapping service of requests from a computer to multiple peripheral devices connected to the computer, wherein each request includes a seek and a data transfer operation, said computer system comprising:

a peripheral hard disk drive connected to said computer via a first IDE controller included within said hard disk drive;

a peripheral CD-ROM drive connected to said computer via a second IDE controller included within said CD-ROM drive;

first driver means in said computer for initiating a seek operation for said CD-ROM drive in response to a request from said computer to said CD-ROM drive;

a timer having a period of approximately 20 milliseconds started upon initiation of said seek operation for said CD-ROM drive;

second driver means in said computer for initiating execution of a request from said computer to said hard disk drive;

first determining means in said computer for determining whether the execution of the request to said hard disk drive is complete;

second determining means in said computer, responsive to said timer timing out, and responsive to said first determining means determining that the execution of the request to said hard disk drive is complete, for determining whether said CD-ROM drive has completed its seek operation;

wherein said CD-ROM drive sets a bit in a register in said computer when said CD-ROM drive has completed its seek operation, and wherein said second determining means monitors said bit to determine whether said CD-ROM drive has completed its seek operation;

third driver means in said computer, responsive to said second determining means, for executing a data transfer operation for said CD-ROM drive if said CD-ROM drive has completed its seek operation; and timer reset means, responsive to said second determining means, for resetting the timer if said CD-ROM drive has not completed its seek operation.

* * * * *